United States Patent
Nicholson et al.

(10) Patent No.: US 10,018,985 B2
(45) Date of Patent: Jul. 10, 2018

(54) COMPUTER NUMERICAL CONTROL ASSEMBLY OR PROCESSING OF COMPONENTS

(71) Applicant: TRANSFORMIX ENGINEERING INC., Kingston (CA)

(72) Inventors: Kenneth Wayne Nicholson, Kingston (CA); Philip David Munroe, Kingston (CA); Martin George Smith, Kingston (CA); Robert David Almas, Kingston (CA)

(*) Notice: Subject to any disclaimer, the term of this patent is extended or adjusted under 35 U.S.C. 154(b) by 0 days.

(21) Appl. No.: 15/503,104

(22) PCT Filed: Aug. 12, 2015

(86) PCT No.: PCT/CA2015/000460
§ 371 (c)(1),
(2) Date: Feb. 10, 2017

(87) PCT Pub. No.: WO2016/023101
PCT Pub. Date: Feb. 18, 2016

(65) Prior Publication Data
US 2017/0227946 A1 Aug. 10, 2017

Related U.S. Application Data

(60) Provisional application No. 62/036,305, filed on Aug. 12, 2014.

(51) Int. Cl.
*B23Q 41/02* (2006.01)
*G05B 19/19* (2006.01)
(Continued)

(52) U.S. Cl.
CPC ............. *G05B 19/19* (2013.01); *B23Q 41/02* (2013.01); *B25J 9/1669* (2013.01);
(Continued)

(58) Field of Classification Search
CPC ...... B23Q 17/00; B23Q 41/02; G05B 19/182; G05B 19/19; G05B 19/4145; B25J 9/1669
(Continued)

(56) References Cited

U.S. PATENT DOCUMENTS 3,886,421 A * 5/1975 Hassan .................. G05B 19/39
                                                    318/593
3,904,945 A * 9/1975 Hassan .................. G05B 19/39
                                                    318/593
(Continued)

FOREIGN PATENT DOCUMENTS

WO         2014078938 A1      5/2014

OTHER PUBLICATIONS

International Search Report corresponding to PCT/CA2015/000460; Canadian Intellectual Property Office; dated Nov. 3, 2015.
(Continued)

*Primary Examiner* — Bentsu Ro
*Assistant Examiner* — Thai Dinh
(74) *Attorney, Agent, or Firm* — Anil Bhole; Bhole IP Law

(57) ABSTRACT

The invention relates to a device, system and method of automated manufacture comprising: delivering a workpiece with a delivery device; receiving the workpiece with a receiving device, the delivering of the workpiece and the receiving of the workpiece being electronically synchronized; processing the workpiece with a processing tool while the workpiece is on the receiving device; transferring the workpiece to a completion device, the ejection of the workpiece and the transferring of the workpiece being electronically synchronized. In particular the workpiece may comprise: a platform with mounts supporting a first component in a selected orientation; and a locating surface, the method
(Continued)

comprising: engaging and disengaging the locating surface of the workpiece with releasable connectors on the delivery device, on the receiving device and on the completion device.

16 Claims, 10 Drawing Sheets

(51) Int. Cl.
　　*G05B 19/414*　　(2006.01)
　　*G05B 19/18*　　(2006.01)
　　*B25J 9/16*　　(2006.01)
　　*G05B 19/418*　　(2006.01)

(52) U.S. Cl.
　　CPC ....... *G05B 19/182* (2013.01); *G05B 19/4145* (2013.01); *G05B 19/41815* (2013.01)

(58) Field of Classification Search
　　USPC .................. 318/560, 568.11, 569, 600, 652
　　See application file for complete search history.

(56) References Cited

U.S. PATENT DOCUMENTS

| | | | |
|---|---|---|---|
| 4,604,704 A | 8/1986 | Eaves et al. | |
| 4,782,274 A * | 11/1988 | Teegarden | B23P 19/105 |
| | | | 29/759 |
| 7,385,370 B2 * | 6/2008 | Sekiguchi | G03B 27/02 |
| | | | 318/575 |
| 7,795,833 B2 * | 9/2010 | Sekiguchi | G03B 27/02 |
| | | | 318/560 |
| 2007/0284216 A1 | 12/2007 | Meier et al. | |

OTHER PUBLICATIONS

International Preliminary Report on Patentability corresponding to PCT/CA2015/000460; Canadian Intellectual Property Office; dated Feb. 14, 2017.
Written Opinion of the International Searching Authority corresponding to PCT/CA2015/000460; Canadian Intellectual Property Office; dated Nov. 3, 2015.
European Search Report corresponding to European Patent No. 15832329.5.

* cited by examiner

COMPUTER NUMERICAL CONTROL ASSEMBLY OR PROCESSING OF COMPONENTS

TECHNICAL FIELD

The invention relates to an automated method of assembling or processing components using computer numerical controlled devices wherein the timing, position, speed, velocity, and acceleration of the components during each stage of assembly or processing are synchronized through programming of the computer numerical controls. The method provides for use of a standardized platform and carrier for mounting and handling of multiple components simultaneously.

BACKGROUND OF THE ART

Manufacturing of products includes the automated creation and processing of parts, and the assembly of the finished product from parts. In the following description the term "component" is chosen as a general term to describe individual parts, an assembly of parts, materials such as adhesives, weld consumables or plastic to be molded, and the final product of a manufacturing process.

The Applicant in international publication WO 2014/078938 has described a method of manufacturing that uses computer numerically controlled drives to move and process components through various stages where the timing, position, orientation, linear or rotary velocity, and acceleration of the components and devices that deliver/receive components are matched. Computer numerical control of linear or drives, actuators, sensors and other devices is coordinated through programming known as "electronic camming".

Electronic camming coordinates the actuation of multiple mechanisms through electronic controls and software. The mechanisms need not physically interact and synchronization of their motions is electronically controlled with extreme accuracy and flexibility through software interaction. Electronic camming links movements of devices through electronic means (i.e. software), conceptually in the same manner that gears, linkages, and timing chains link movements of mechanical devices together, with enhanced accuracy, control and design flexibility.

An application of electronic camming in the processing of single components or assembling of multiple components together is described in international publication WO 2014/078938 that can be summarized as follows. A first component is loaded, separated from an intake stream and accelerated. The component is delivered at a predetermined delivery time, delivery position, delivery speed and moving along a delivery trajectory to be delivered to and received by a processing tool that is also moving. The motions of the delivery device and the processing tool receiving of the component are electronically synchronized. The transfer of the component from one device to the other is coordinated and timed electronically. Through the processing or assembly process, the actuators that move the devices to handle the component are electronically cammed and synchronized together.

The same concept can be applied to each stage of a manufacturing process where separate devices have their motions coordinated through electronic camming and CNC program software. Manufacturing involves storage of material/components, motion control, and processing of material/components, for example: molding, forming, cutting, bonding, welding, stamping, dispensing, assembling, fastening; as well as inspecting, testing, measuring and rejecting failed material/components.

In many of the manufacturing stages, accurately timed and controlled movement of material and components is critical. During automated manufacturing accurate coordinated control of motion and processing activities can be provided through electronic control of actuators, servo motors, sensors, switches, valves and the like, that are linked by software.

Features that distinguish the present invention from the background art will be apparent from review of the disclosure, drawings and description of the invention presented below.

DISCLOSURE OF THE INVENTION

The invention relates to processing and handling of individual components or multiple components grouped together on a standardized platform or carrier to be processed and handled without contact with the individual components. To include both cases the general term "workpiece" is used to encompass processing and handling of both the individual components and a platform or carrier on which multiple components are mounted.

The invention provides a method of automated manufacture comprising: delivering a workpiece with a delivery device by: loading the workpiece at an intake position of the delivery device; separating the workpiece by moving the workpiece from the intake position; accelerating the workpiece; and presenting the workpiece at a predetermined delivery time, delivery position, delivery speed and moving along a delivery trajectory; receiving the workpiece with a receiving device moving along a receiving trajectory configured to permit transfer of the workpiece at the delivery position from the delivery device to the receiving device, the delivering of the workpiece and the receiving of the workpiece being electronically synchronized; processing the workpiece with a processing tool while the workpiece is on the receiving device; presenting the workpiece at a predetermined ejection time, ejection position, ejection speed and moving along an ejection trajectory; transferring the workpiece to a completion device moving along a completion trajectory configured to permit transfer of the workpiece at the ejection position from the receiving device to the completion device, the ejection of the workpiece and the transferring of the workpiece being electronically synchronized. In particular the workpiece may comprise: a platform with mounts supporting a first component in a selected orientation; and a locating surface, the method comprising: engaging and disengaging the locating surface of the workpiece with releasable connectors on the delivery device, on the receiving device and on the completion device.

In another aspect, the disclosure describes a system comprising: a delivery device configured to deliver a workpiece by: loading the workpiece at an intake position of the delivery device; separating the workpiece by moving the workpiece from the intake position; accelerating the workpiece; and presenting the workpiece at a predetermined delivery time, delivery position, delivery speed and moving along a delivery trajectory; a receiving device configured to receive the workpiece by moving along a receiving trajectory configured to permit transfer of the workpiece at the delivery position from the delivery device to the receiving device, and to present the workpiece at a predetermined ejection time, ejection position, ejection speed and moving along an ejection trajectory; a processing tool configured to process the workpiece while the workpiece is on the receiving device; a completion device configured to accept transfer of the workpiece at the ejection position from the receiving device after processing, the completion device moving along a completion trajectory, a data processor; and a medium comprising machine-readable instructions executable by the data processor and configured to cause the data processor to generate signals useful in the synchronization of the: delivering of the workpiece and the receiving of the workpiece; processing of the workpiece; and transferring of the workpiece to the completion device. In a further aspect of the invention the workpiece comprises: a platform with mounts supporting a first component in a selected orientation; and a locating surface; and wherein the machine-readable instructions are configured to cause the data processor to generate signals useful in the synchronization of the: engaging and disengaging the locating surface of the workpiece with releasable connectors on the delivery device, on the receiving device and on the completion device. In a further aspect of the invention each of the delivery device, the receiving device, the processing tool and the competition device have motion actuators each with at least one axis of motion; and wherein the machine-readable instructions are configured to cause the data processor to generate signals useful in the controlling motion on each of the at least one axis of motion using a plurality of servo applications electronically cammed together on a standardized backplane of coded instructions.

In another aspect, the disclosure describes an automated device comprising: a delivery device having a numerically controlled delivery drive for: loading a workpiece at an intake position of the delivery device; separating the workpiece by moving the workpiece from the intake position; accelerating the workpiece; and presenting the workpiece at a predetermined delivery time, delivery position, delivery speed and moving along a delivery trajectory; a receiving device having a numerically controlled receiving drive for moving along a receiving trajectory configured to permit transfer of the workpiece at the delivery position from the delivery device to the receiving device; a processing device having a numerically controlled processing drive for processing the workpiece with a processing tool while the workpiece is on the receiving device; the numerically controlled receiving device being configured for presenting the workpiece at a predetermined ejection time, ejection position, ejection speed and moving along an ejection trajectory; a completion device having a numerically controlled completion drive for moving along a completion trajectory configured to transfer the workpiece at the ejection position from the receiving device to the completion device, the delivering of the workpiece and the receiving of the workpiece being electronically synchronized by the numerically controlled delivery and receiving drives, the processing of the workpiece being electronically synchronized by the numerically controlled processing drive, and the ejection of the workpiece and the transferring of the workpiece being electronically synchronized by the numerically controlled delivery and receiving drives, wherein the workpiece comprises: a platform with mounts supporting a first component in a selected orientation; and a locating surface; and the delivery device, the receiving device and the completion device include releasable connectors for engaging and disengaging the locating surface of the workpiece.

DESCRIPTION OF THE DRAWINGS

In order that the invention may be readily understood, embodiments of the invention are illustrated by way of examples in the accompanying drawings.

Further details of the invention and its advantages will be apparent from the detailed description included below.

DETAILED DESCRIPTION OF PREFERRED EMBODIMENTS

This description employs the terms "delivery device", "receiving device, and "completion device" merely to imply a progression of the workpiece or processing from delivery to receiving to completion. Alternative terms could be used such as first, second and third to imply the same progression. Any of the devices can simply transfer workpieces from one location or position to another without processing or changing the workpiece. Any of the devices can also be a platform that includes tools or processing to perform some value-added function to the workpiece for example scanning, forming, welding, assembling, changing orientation or applying adhesives. Further although many of the devices are shown as rotating, the description herein uses general terms which are meant to also include devices that translate in a linear motion, in x-y-z Cartesian motion, in a curved trajectory or any other motion.

Figure 1:
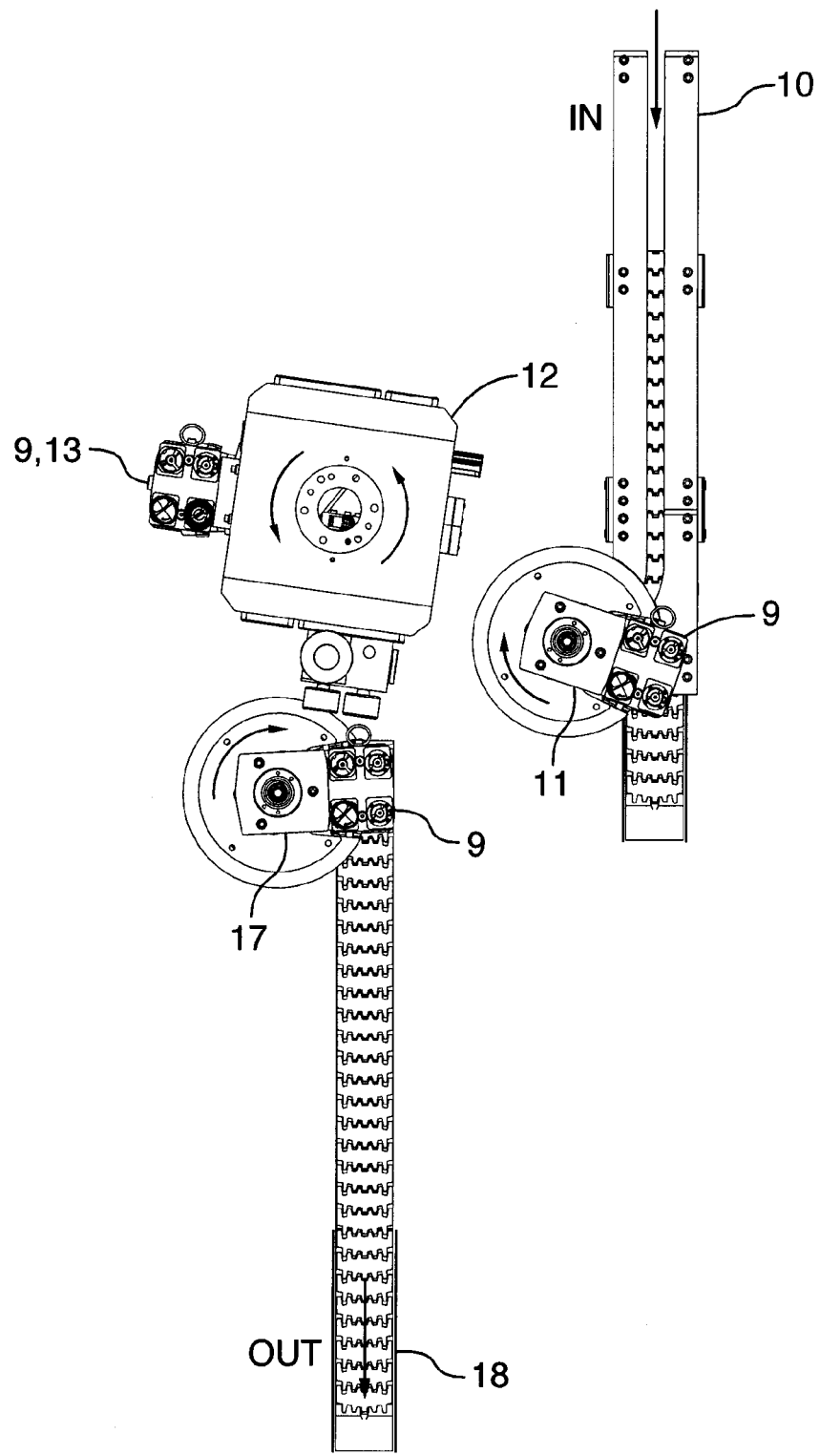
FIG. 1 is a plan view of a "rotary engine" embodiment including linear input and output conveyors, a rotary delivery device for moving a workpiece from the input conveyor to the central rotary receiving device, the receiving device having processing tools mounted thereon, and a rotary completion device for moving a workpiece from the central rotary receiving device to the output conveyor.
Figure 3:
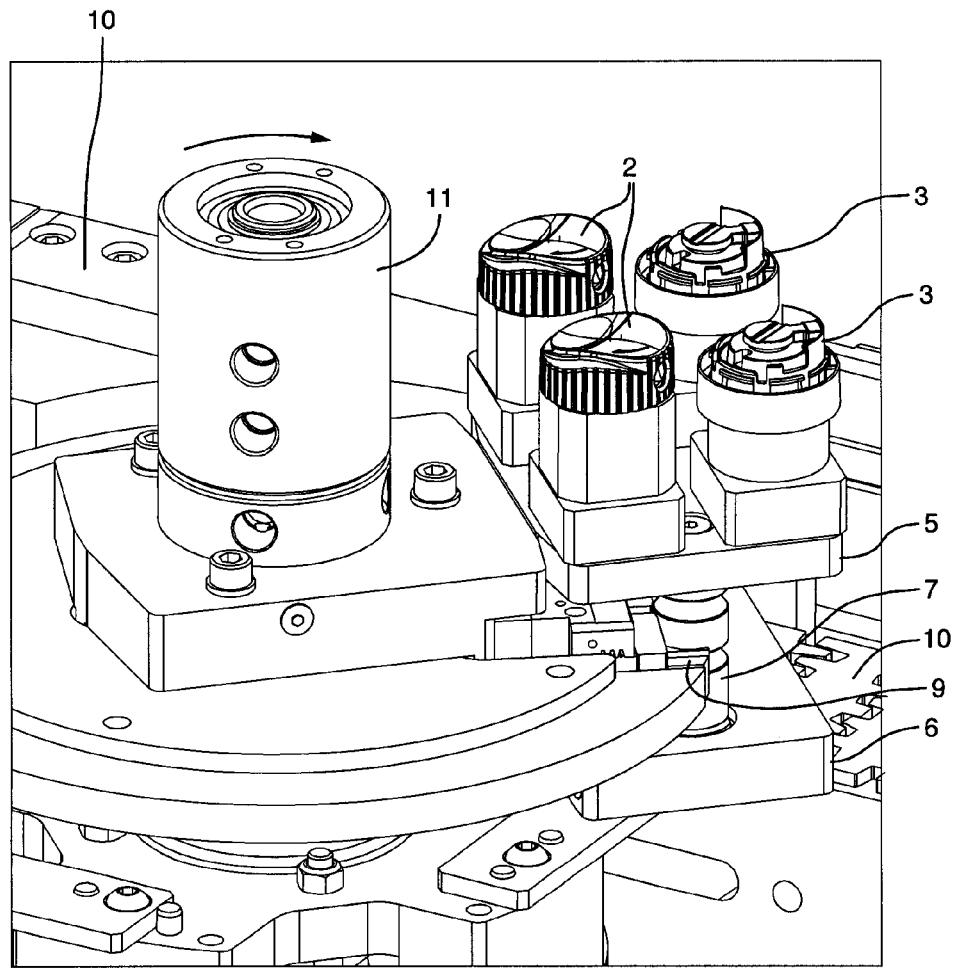
FIG. 3 is a side perspective view of the workpiece of FIG. 2 with the locating pins being gripped by grip fingers of the rotating delivery device and removing the workpiece from the input conveyor.
Figure 4:
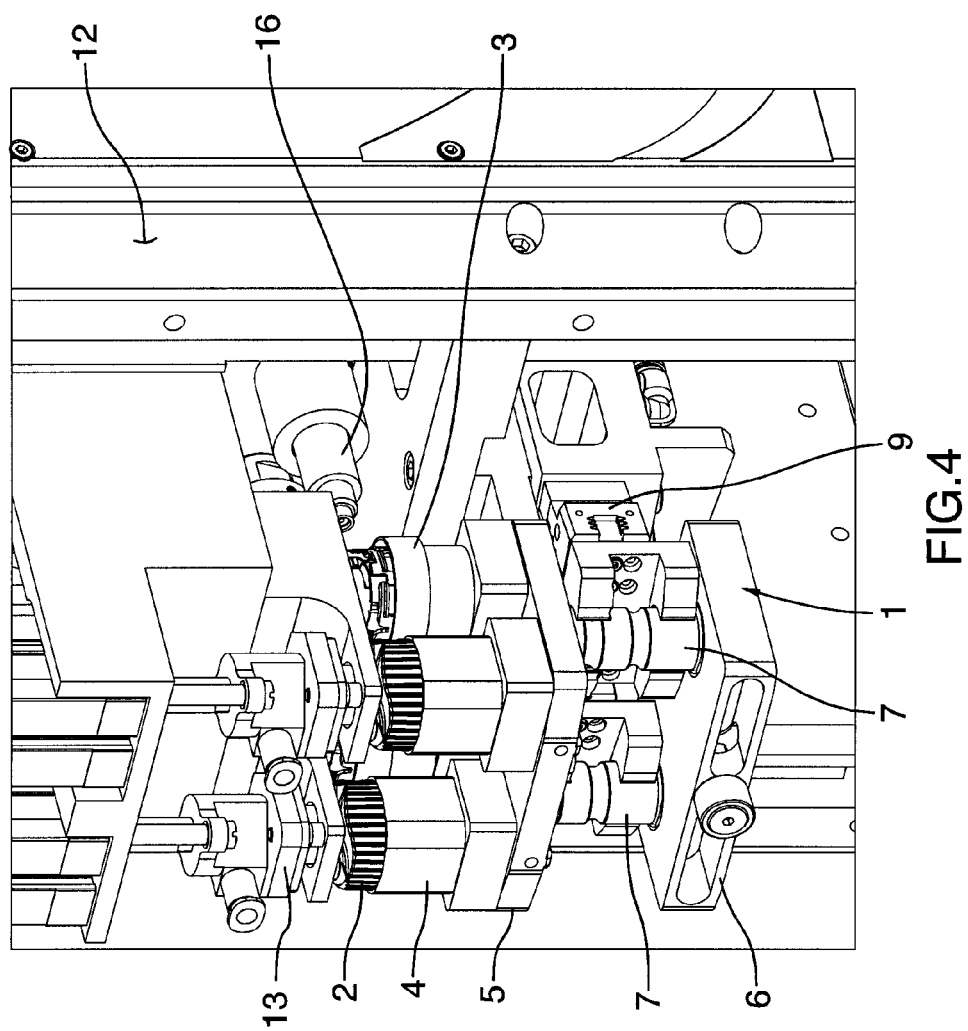
FIG. 4 is a side perspective view of the rotating receiving device, also with grip fingers engaging the locating pins of the workpiece, showing the processing device in position to vertically engage two cap components to be assembled on to the two body components radially inboard.
Figure 5:
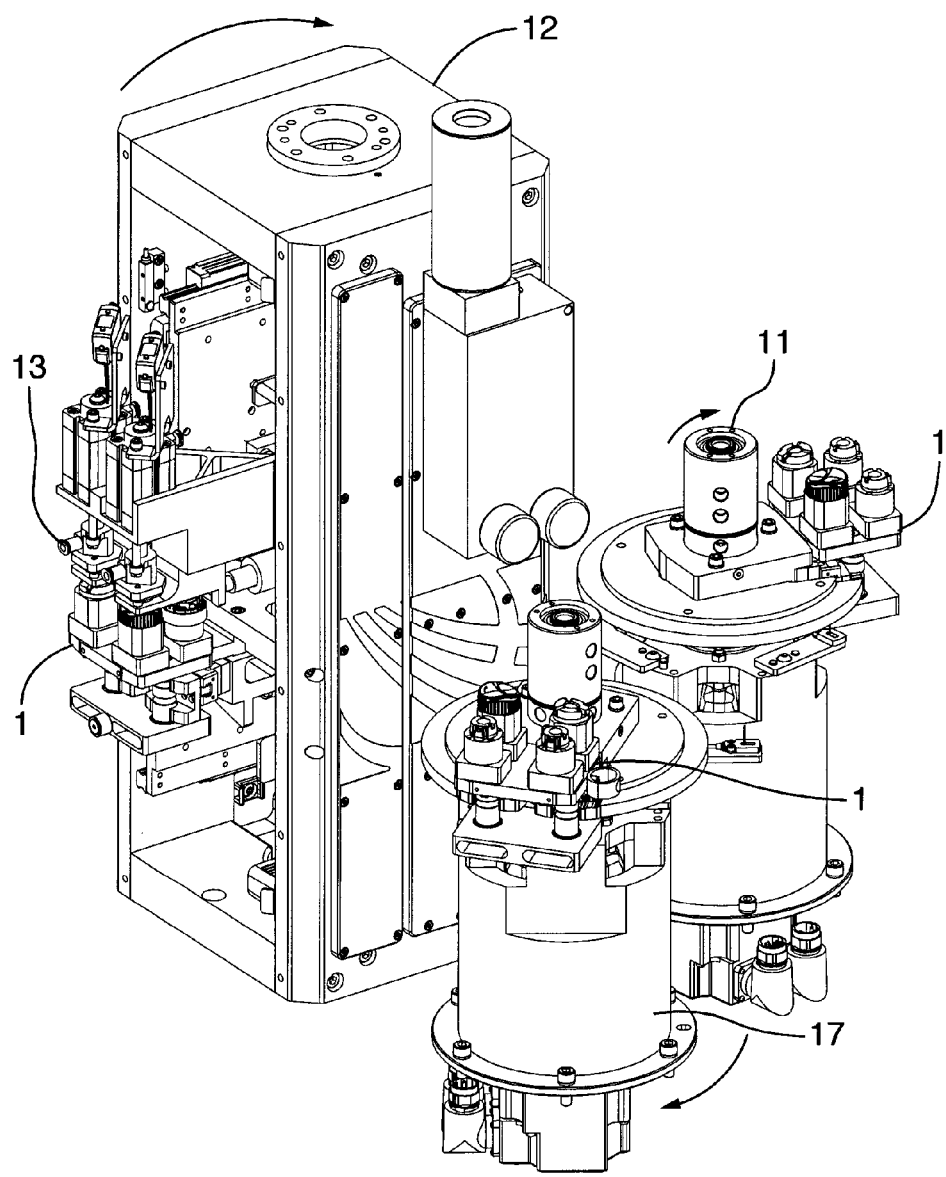
FIG. 5 is a side perspective view of the rotary engine of FIG. 1, absent the input and output conveyors, and showing three workpieces being gripped by the grip fingers of the delivery, receiving and completion devices.

The rotary engine embodiment shown in FIGS. 1 and 5 is configured to handle and process two pairs of components that are initially mounted on standardized pallets or "PODs" 1. The POD 1 with four components (2, 3) are best shown in FIG. 2 and handling by the rotary indexing tables and processing on the central rotary tool platform are shown in FIGS. 3 and 4 respectively.

Figure 2:
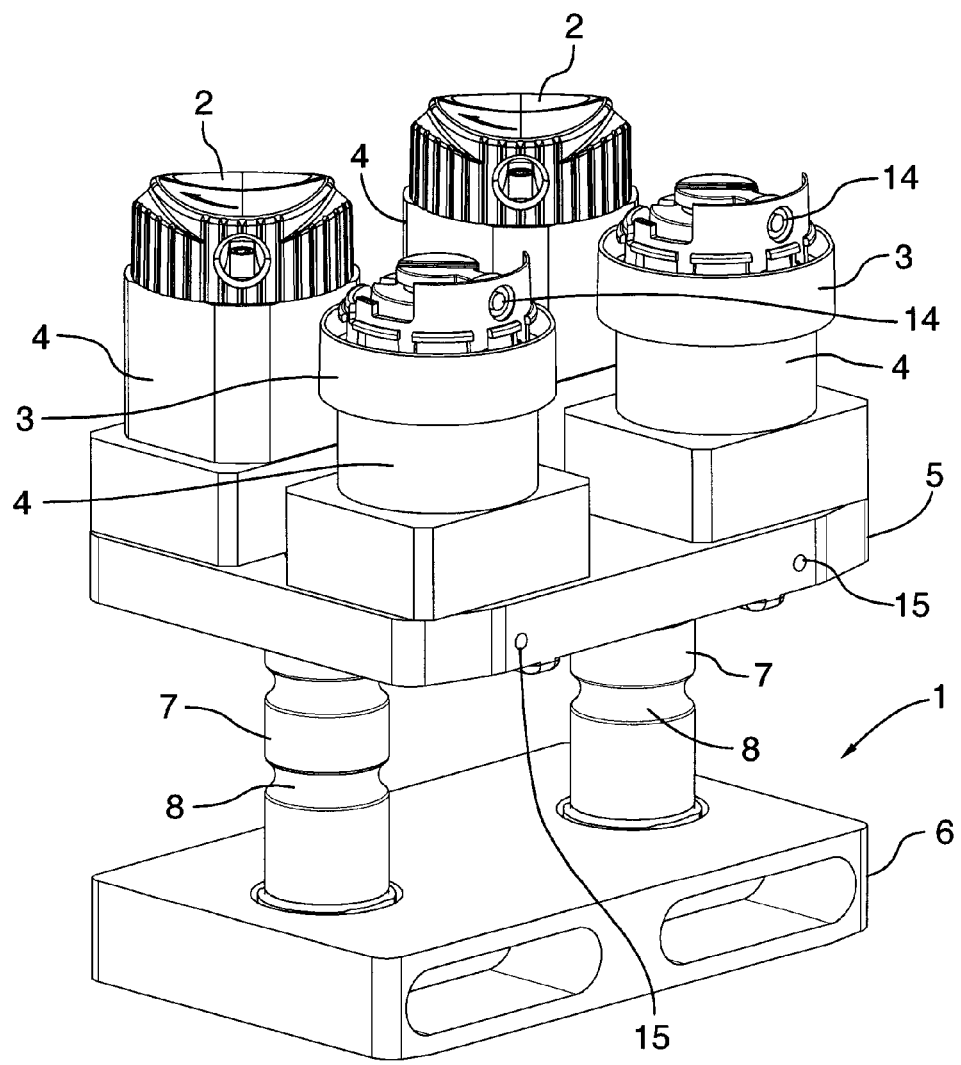
FIG. 2 is a side perspective view of an example workpiece having a platform with mounts supporting two sets of components in a selected orientation, the platform being supported on locating pins and a base, where the locating pins are gripped by releasable grip fingers to handle and position the components for assembly together during processing.

Referring to FIG. 2, the PODs 1 are initially loaded with spray bottle top components, being two caps 2 and two bodies 3, on mounts 4 that are designed to hold the caps 2 and bodies 3 in a specified rotational orientation. The mounts 4 can easily be removed and replaced depending on the type of components being handled and processed. The POD 1 is handled and processed as an individual workpiece and handling of individual components (2, 3) is limited thereby maintaining the orientation and avoiding damage from contact during handling. PODs 1 can be loaded with caps 2 and bodies 3 by a pick and place robot, by manual labor, during the plastic molding process or by various automated means, including pick and place robots as described below. The example illustrated shows two caps 2 and two bodies 3. It will be understood that the standardized use of a platform 5 with replaceable mounts 4 permits variations such as mounting of any number of identical parts that can fit on the platform 5, or mounting of any number of different components in multiple rows and columns depending on the processing or assembly required.

The POD 1 in the example shown in FIG. 2 has a platform 5 and a base 6 joined with two locating pins 7. Each pin 7 has an accurate locating surface, shape and position, as well as locating grooves 8 to be accurately engaged and disengaged during handling by releasable connectors shown as grip fingers 9 (see FIGS. 3-4). The grip fingers 9 open and close to engage the locating pins 7 very accurately during handling and processing. For example, the grip fingers 9 can include locating ridges (not shown) that mate with the locating grooves 8 to engage and secure the PODs 1 within suitable tolerances for highly accurate handling, assembly and processing.

An advantage using PODs 1 is that, once the other machinery has been set up to process the PODs 1 as workpieces, to process different sized or shaped components (2, 3) the major portion of the machinery need not be extensively modified. Modification is limited to the mounts 4 and to other replaceable tools or parts that contact the components (2,3). The costs and downtime involved in retooling a system to process different components is greatly reduced in many cases.

Referring to FIGS. 1 and 5, PODs 1 as workpieces are loaded with caps 2 and bodies 3 and supplied in an input stream along the input conveyor 10 to a intake position adjacent the rotary delivery device 11. FIG. 3 shows a detail of the POD 1 with the locating pins 7 being gripped by grip fingers 9 of the rotating delivery device 11 and removing the POD 1 or workpiece from the input conveyor 10.

The POD 1 is delivered to the rotating receiving device 12 by the delivery device 11 in a synchronized manner by bringing the stationary POD 1 on the input conveyor 10 up to a rotary speed that matches the rotary speed of the receiving device 12 at the time when the pod 1 is transferred.

The steps of doing so can be summarized as "rapid speed matching" (RSM) which includes: loading the workpiece POD 1 at the intake position; separating the workpiece POD 1 from other PODs 1 and the input conveyor 10 by moving the POD 1 from the intake position; rotationally accelerating the POD 1; and presenting the POD 1 to the open grip fingers 9 of the rotating receiving device 12 at a predetermined delivery time, delivery position, delivery speed and moving along a delivery trajectory. The POD 1 is released by opening the grip fingers 9 of the rotating delivery device 11 and engaged by closing the grip fingers 9 of the rotating receiving device 12 at the predetermined delivery time. Instantaneous coordination of these movements is provided by electronic camming software controlling all of the required actuators. To do so the receiving device 12 moves along a receiving trajectory configured to permit transfer of the POD 1 at the delivery position from the delivery device 11 to the receiving device 12, where the delivering of the POD 1 and the receiving of the POD 1 are electronically synchronized.

At this point the POD 1 is secured to the rotating receiving device 12 by the grip fingers 9 as shown in FIG. 4. In the example illustrated, the receiving device 12 also houses a vertically and horizontally actuated processing tool 13 which assembles and tests the components (2, 3) on the POD 1 together as follows.

As shown in FIG. 2, the bodies 3 include a spray nozzle openings 14. The platform 5 includes two fluid ports 15 which can convey pressurized air, via channels through the platform 5 and the mounts 4, to the spray nozzle openings 14. After assembly of spray nozzles (not shown) into the openings 14, the pressurized air flow is used to test whether the assembly can properly convey air flow through the body 3 and nozzle (not shown) before the cap 2 is assembled to the body 3.

Referring to FIG. 4, the grip fingers 9 hold the pod 1 in position on the receiving device 12. Nozzle holders 16 retain nozzles (not shown) and move radially outwardly (to left as drawn) to install a nozzle in each of the spray nozzle openings 14. The nozzle holders 16 then move vertically downward the end of the nozzle holder 16 to seal against the fluid ports 15 in the platform 5. Compressed air conveyed through the nozzle holder 16 and fluid ports 15 passes through the nozzle (not shown) to produce a positive test result. If air flow is not detected, by no air pressure change for example, the assembled body 3 and nozzle are rejected downstream. If a positive air flow test is detected, the processing device is lowered to pick up the caps 2 from the mounts 4. Then the processing device 13 moves radially inward and down to place the caps 2 on the bodies 3 to complete assembly.

As shown in FIGS. 1 and 5, the rotary engine also includes a rotary completion device 17 for moving the POD 1 bearing two completed assemblies (bodies 3 with nozzles and caps 2) from the central rotary receiving device 12 to the output conveyor 18.

In the example shown, when considered relative to the axis of the receiving device 12, the angular spacing between the delivery device 11 and the completion device 17 is less than 90° which leaves more than 270° of rotation during which the receiving device 12 and processing tool 13 have time to test and assemble the components (2, 3). However it will be understood that the rotation speed of the receiving device 12 need not be constant. Electronic camming software can be coded to speed up and slow down rotation in any manner desired to provide sufficient time for testing and assembly actions.

Once assembly or processing is completed, using the processing tool 13 while the POD 1 is on the receiving device 12, the POD 1 is presented at a predetermined ejection time, ejection position, ejection speed and moving along an ejection trajectory by computer numerical control of the rotary driver of the receiving device 12. The POD 1 is transferred from the grip fingers 9 of the rotating receiving device 12 to the open grip fingers 9 of the rotating completion device 17. The rotating completion device 17 moves along a completion trajectory configured to permit transfer of the POD 1 at the ejection position from the receiving device 12 to the completion device 17, the ejection of the POD 1 and the transferring of the POD 1 being electronically synchronized. The completion device 17 is a rotary actuated input indexing platform with grip fingers 9 configured to place the POD 1 from the receiving device 12 into an output stream of like PODs 1 on the output conveyor 18. To do so the rotary speed of the completion device 17 must change from matching the rotary speed of the receiving device 12 to match the speed of the output conveyor 18. Of course all devices could be programmed to rotate continuously like meshed gears, however with separate electronic camming controls each device is able to change rotational velocity and even direction to suit any desired timing and processing plan.

All of the movements described above are controlled by electronic camming software and other software dedicated to the rotary engine. The rotary engine is an example of the grouping of electronically cammed devices which together can be integrated as a unit into various larger systems as a sub-system. The electronically cammed system includes a data processor and a information storage medium to record machine-readable instructions executable by the data processor and configured to cause the data processor to generate signals to synchronize the: delivering of the workpiece (POD 1 or individual components 2, 3) and the receiving of the workpiece; processing of the workpiece; transferring of the workpiece to the completion device 17; engaging and disengaging the locating pins 7 of the PODs 1 with releasable connectors or grip fingers 9 on the delivery device 11, on the receiving device 12 and on the completion device 17.

Besides the "rotary engine" described above, the benefits of grouping devices together into standardized "engines" or sub-systems has been found useful in designing and assembling larger more complex manufacturing systems. Each sub-system provides for common functions and can be built and tested separately. As suggested by the system shown in FIG. 10, a system can be centered around a core material handling device, such as the oval shaped linear servo track conveyor with individually controlled carriers that transport workpieces, components or tools. One such servo conveyor is marketed by Rockwell Automation under the trade mark iTRAC™ for example and so need not be explained in detail herein.

A system may be conceptualized as a n-axis system level robot having a potentially limitless or n-axes of motion distributed throughout all integrated devices. A central device such as a servo conveyor can act as a master axis device with auxiliary devices around the conveyor acting as slave devices with their own slave axes in coordination with the master axis device. The system has a central control where software generates signals for synchronizing of the: delivering of the workpiece and the receiving of the workpiece; processing of the workpiece; and transferring of the workpiece to the completion device, as well engaging and disengaging the grip fingers 9 and all other motions. Each of the delivery device, the receiving device, the processing tool and the competition device comprise actuators each with at least one axis of motion; and software generates signals to control motion on each axis of motion using standardized servo applications electronically cammed together on a standardized backplane of coded instructions. The common servo application software leads to common software for groupings of devices into sub-systems, named "engines" herein. Common engine or sub-system software combined in an electronically cammed n-axis system level robot, leads to efficiencies in designing and building through standardization.

Figure 8:
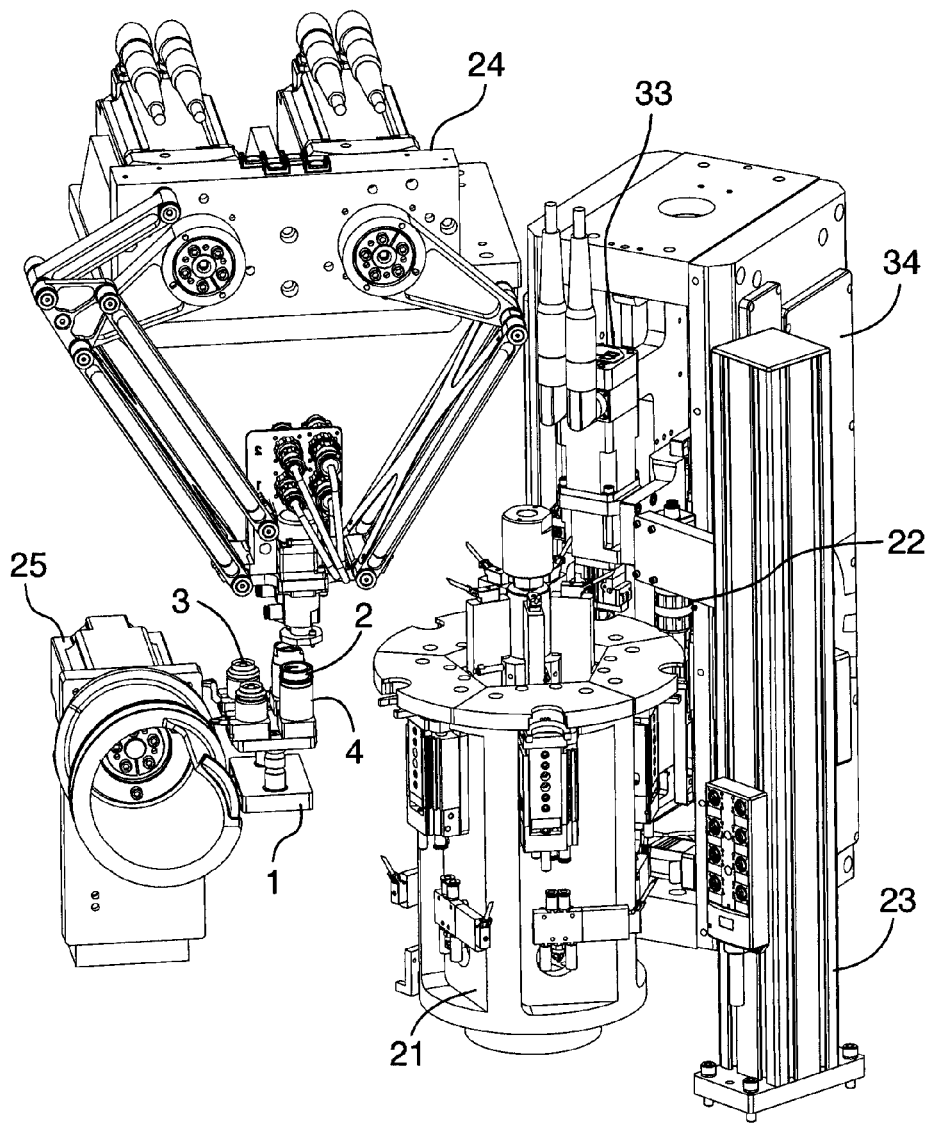
FIG. 8 is a side perspective view of a "multiplex engine embodiment" where the linear actuated screw conveyor (i.e. completion device) serves both to input components from the workpiece and to output components back to the workpiece (components being supplied on mounts supported by the workpiece platform, locating pins and base), the pick and place robot (i.e. receiving device) transfers and orients components on the rotary indexing platform (i.e. delivery device) to be processed by the optical scanner housed on the stationary post (i.e. processing device), the pick and place robot (i.e. receiving device) also transfers and orients components from the rotary indexing platform and returns the components to the mounts on the platform of the workpiece disposed on the linear actuated screw conveyor (i.e. completion device).
Figure 9:
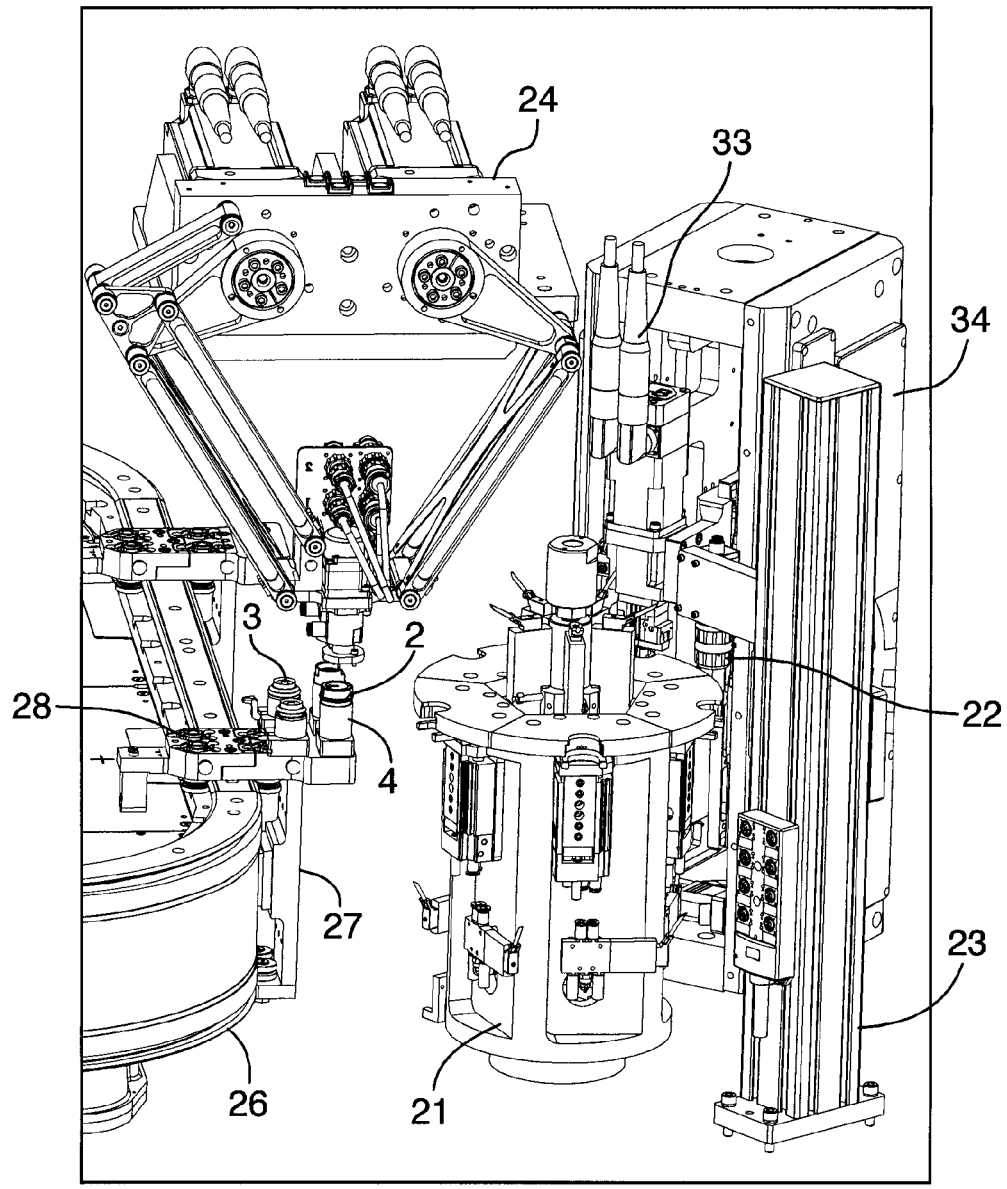
FIG. 9 is a side perspective view of a second "multiplex engine embodiment" where the linear actuated screw conveyor (completion device) of FIG. 7 is replaced with a linear actuated servo driven carrier (completion device) having a top platform with mounts on which components are input and output, and the other elements remain the same as FIG. 7 (pick and place robot, rotary indexing platform, optical scanner processing device).
Figure 10:
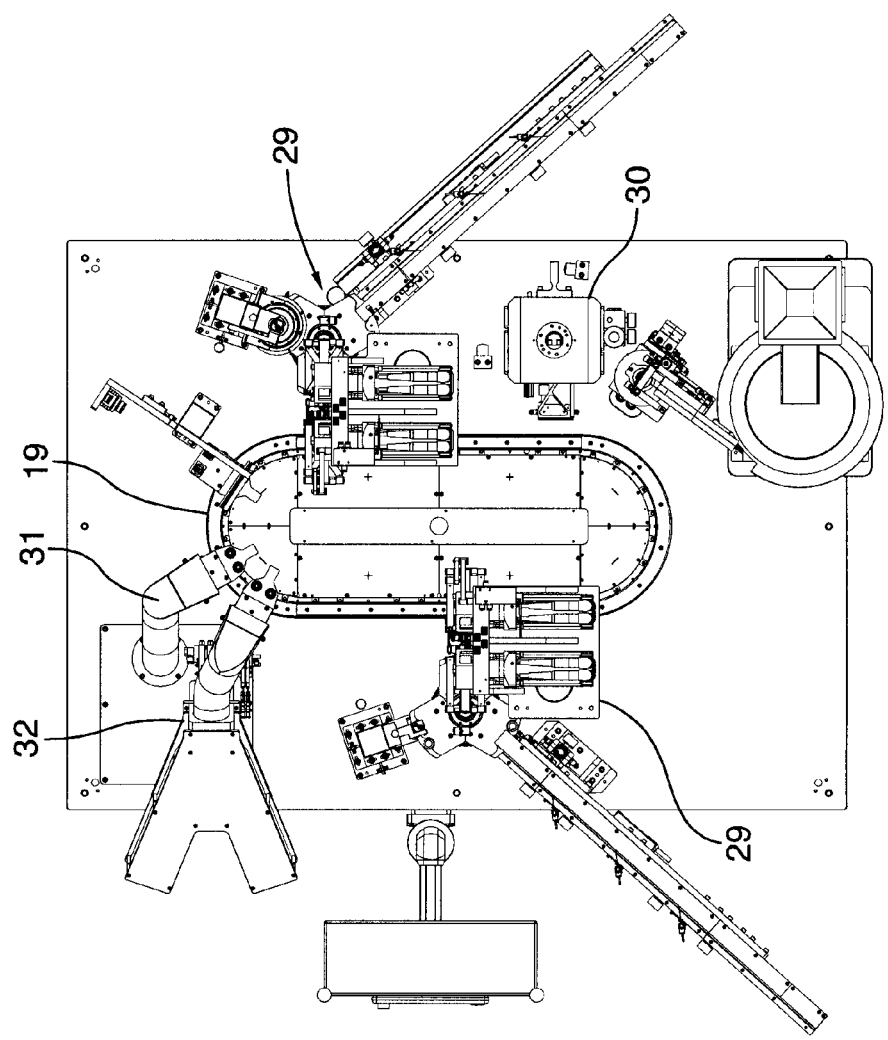
FIG. 10 is a plan view of an integrated system including a central oval shaped track with multiple linear actuated servo driven carriers supplying components to engines or processing stations located around the track.

FIGS. 6, 7, 8 and 9 show example "engines" that can group common functions and devices together in a sub-system for use alone for simple processes or as a sub-system of an integrated manufacturing system shown in FIG. 10.

Figure 6:
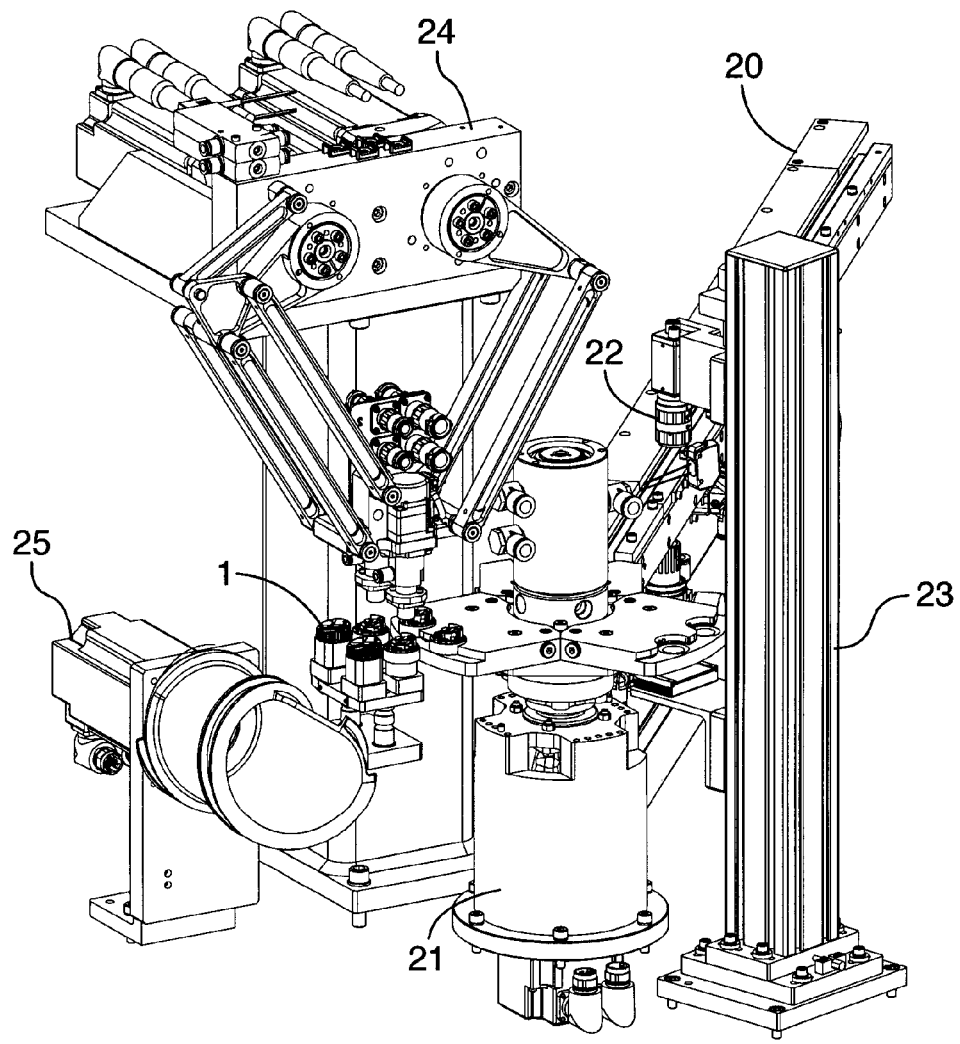
FIG. 6 is a side perspective view of a "pick and place engine" embodiment showing a linear conveyor supplying a stream of components to a rotary input indexing platform (i.e. delivery device), a stationary post housing an optical scanner (i.e. an example of many possible processing devices), a pick and place robot (i.e. receiving device) that transfers and orients components from the indexing platform to the mounts on the platform of the workpiece disposed on a linear actuated screw conveyor (i.e. completion device).

FIG. 6 shows a "pick and place engine" embodiment with a linear conveyor 20 supplying a stream of individual components (for example caps 2, and/or bodies 3) to be picked by a rotary input indexing platform 21 (delivery device). Multiple linear conveyors 20 could be arranged for example radiating out from the rotation axis of the indexing platform 21 to supply multiple streams of different components or multiple streams of PODs, but for the simplicity of illustrating the concept only one conveyor 20 is shown. An optical scanner 22 (processing device) is housed in a stationary post 23 to scan components on the indexing platform 21. It will be understood that the optical scanner 22 is only an example of a possible processing device and that the post 23 may be actuated for any type of motion or include assembly tools if desired.

The pick and place robot 24 (receiving device) rotates and orients components from the indexing platform 21 to transfer the components on the mounts 4 of the PODs 1 disposed on a linear actuated screw conveyor 25 (completion device). Therefore the pick and place engine or sub-system is made up from a delivery device comprising a rotary actuated input indexing platform 21 configured to pick a component (such as a cap 2 or body 3) from an input stream of like components supplied by the linear conveyor 20. The receiving device comprises a pick and place robot 24 and the completion device comprises a linear actuated conveyor 25 configured to accept the components (2, 3) from the pick and place robot 24 onto a POD 1.

Figure 7:
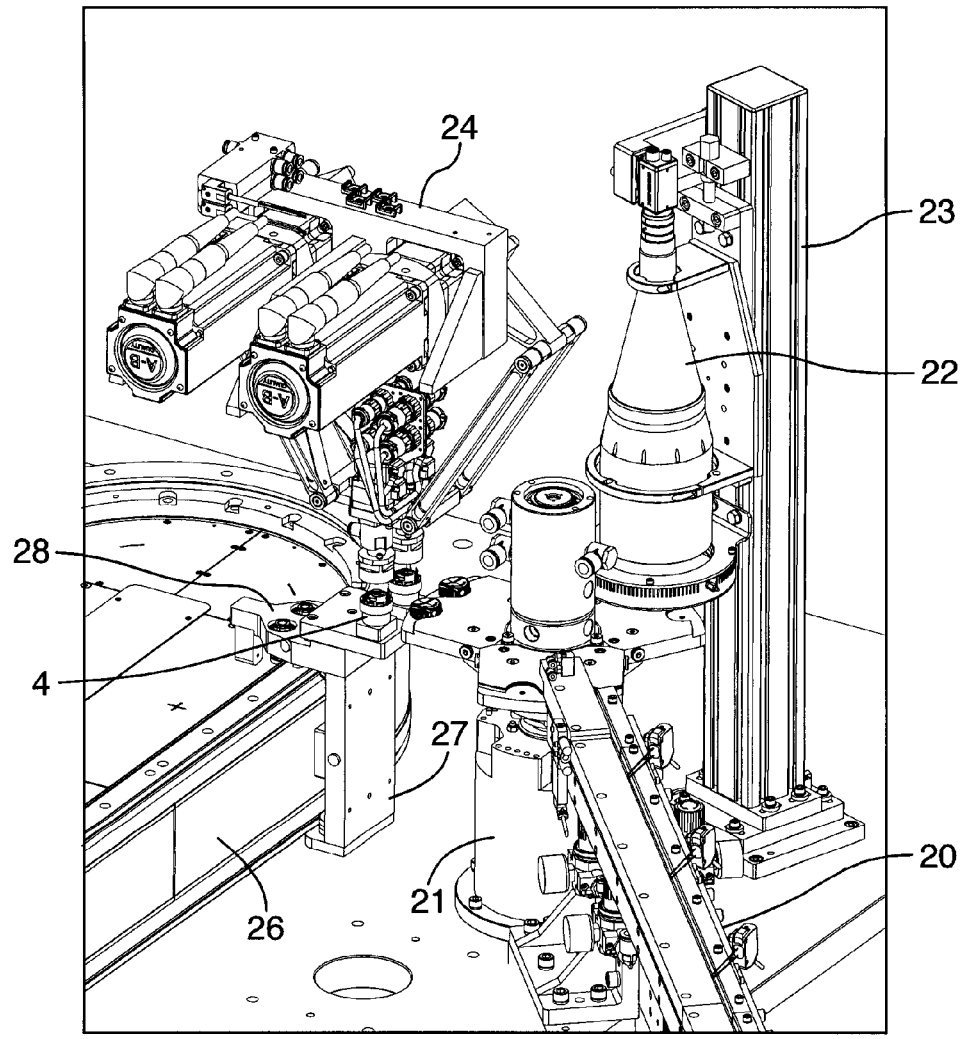
FIG. 7 is a side perspective view of an alternative "pick and place engine" embodiment showing a linear conveyor in the foreground supplying a stream of components to the rotary input indexing platform, a stationary post housing an optical scanner, a pick and place robot that transfers and orients components from the indexing platform to the mounts on the top platform of a movable carrier disposed on an oval servo actuated track conveyor.

FIG. 7 shows an alternative embodiment of the pick and place engine of FIG. 6. The linear conveyor 20 supplies a stream of individual components (2, 3 for example) to the rotary indexing platform 21 and passes the components under the optical scanner 22 mounted on the post 23. The post 23 and optical scanner 22 could be replaced by any processing device such as an assembly tool mounted on a rotating platform. The screw conveyor 25 of FIG. 6 is replaced in FIG. 7 with a linear actuated servo drive conveyor 26 having a plurality of servo drive carriers 27 that travel thereon. The top platform 28 of the carriers 27 have mounts 4 on which the components 2, 3 are placed by the pick and place robot 24. The pick and place robot 24 receives signals from the optical scanner 23 and while transferring the components 2, 3 to the mounts 4, end effectors rotate the components 2, 3 to the appropriate rotational orientation on the mounts 4. The PODs 1 can also be mounted to the top platforms 28 of the carriers 27 although this option has not been illustrated.

FIG. 8 shows a "multiplex engine embodiment" where the linear actuated screw conveyor 25 (completion device) serves as a two way conveyor, both to input components (caps 2, bodies 3) from the PODs 1 and to output components (2, 3) back to the PODs 1. Components (2, 3) are supplied on the mounts 4 of the PODs 1 engaged by the conveyor 25. The pick and place robot 24 (receiving device) transfers and orients individual components (2, 3) on the rotary indexing platform 21 (delivery device) to be processed. Processing in the example illustrated has two stages, scanning and assembly. First the components on the rotary indexing table 21 are scanned by the optical scanner 22 housed on the stationary post 23 (processing device) and then components are assembled together with an assembly tool 33. The assembly tool 33 is mounted on a rotary platform 34 that rotates to pick up a different part or component that is assembled to the component on the rotary indexing table 21. After processing, the pick and place robot 24 transfers and orients the assembled components from the rotary indexing platform 21 and returns the assembled components (2, 3) to the mounts 4 on the PODs 1 conveyed on the linear actuated screw conveyor 25 (completion device). Therefore the multiplex engine is a sub-system where the delivery device comprises a rotary actuated input indexing platform 21, the receiving device comprises a pick and place robot 24 and the completion device comprises a linear actuated conveyor 25 configured to present the components (2, 3) on the PODs 1 to the pick and place robot 24 before processing and to accept onto the PODs 1 the components (2, 3) from the pick and place robot 24 after processing.

FIG. 9 shows a second "multiplex engine embodiment" where the linear actuated screw conveyor 25 (completion device) of FIG. 8 is replaced with a linear actuated conveyor 26 with an individual controlled servo driven carrier 27 (completion device). Each carrier 27 has a top platform 28 with mounts 4 on which components (2, 3) are input and output. The other elements remain the same as FIG. 8, i.e. the pick and place robot 24, rotary indexing platform 21, optical scanner 22 processing device, post 23, assembly tool 33 and rotary platform 34.

Referring to the integrated system of FIG. 10, the oval linear servo conveyor 19 can be the type shown in FIG. 9 having a linear conveyor 26 with several individual carriers 27 each being individually controlled to move on a conveyor track between various sub-systems or engines. For example the carriers 27 may be conveyed counterclockwise past: two pick and place engines 29; one rotary engine 30; and pneumatic conveyors 31, 32 which accept completed assemblies and rejected components.

Although the above description relates to a specific preferred embodiment as presently contemplated by the inventors, it will be understood that the invention in its broad aspect includes mechanical and functional equivalents of the elements described herein.

We claim:
1. A method comprising:
delivering a workpiece with a delivery device by: loading the workpiece at an intake position of the delivery device; separating the workpiece by moving the workpiece from the intake position; accelerating the workpiece; and presenting the workpiece at a predetermined delivery time, delivery position, delivery speed and moving along a delivery trajectory;
receiving the workpiece with a receiving device moving along a receiving trajectory configured to permit transfer of the workpiece at the delivery position from the delivery device to the receiving device, the delivering of the workpiece and the receiving of the workpiece being electronically synchronized;
processing the workpiece with a processing tool while the workpiece is on the receiving device;
presenting the workpiece at a predetermined ejection time, ejection position, ejection speed and moving along an ejection trajectory, wherein the workpiece comprises: a platform with mounts supporting a first component in a selected orientation; and a locating surface;
transferring the workpiece to a completion device moving along a completion trajectory configured to permit transfer of the workpiece at the ejection position from the receiving device to the completion device, the ejection of the workpiece and the transferring of the workpiece being electronically synchronized, and
engaging and disengaging the locating surface of the workpiece with releasable connectors on the delivery device, on the receiving device and on the completion device.
2. The method according to claim 1 wherein the platform has mounts supporting a second component, the method comprising:
assembling the first and second components together with the processing tool while the workpiece is on the receiving device.
3. The method according to claim 1 wherein the platform and mounts include a fluid port, the method comprising:
conveying fluid from the processing tool to the fluid port while the workpiece is on the receiving device.
4. A system comprising:
a delivery device configured to deliver a workpiece by: loading the workpiece at an intake position of the delivery device; separating the workpiece by moving the workpiece from the intake position; accelerating the workpiece; and presenting the workpiece at a predetermined delivery time, delivery position, delivery speed and moving along a delivery trajectory, wherein the workpiece comprises: a platform with mounts supporting a first component in a selected orientation; and a locating surface;
a receiving device configured to receive the workpiece by moving along a receiving trajectory configured to permit transfer of the workpiece at the delivery position from the delivery device to the receiving device, and to present the workpiece at a predetermined ejection time, ejection position, ejection speed and moving along an ejection trajectory;
a processing tool configured to process the workpiece while the workpiece is on the receiving device;

a completion device configured to accept transfer of the workpiece at the ejection position from the receiving device after processing, the completion device moving along a completion trajectory, a data processor; and a medium comprising machine-readable instructions executable by the data processor and configured to cause the data processor to generate signals useful in the synchronization of the:

delivering of the workpiece and the receiving of the workpiece;

processing of the workpiece; and transferring of the workpiece to the completion device, wherein the machine-readable instructions are configured to cause the data processor to generate signals useful in the synchronization of the: engaging and disengaging the locating surface of the workpiece with releasable connectors on the delivery device, on the receiving device and on the completion device.

5. The system as defined in claim 4:

wherein each of the delivery device, the receiving device, the processing tool and the completion device comprise actuators each with at least one axis of motion; and wherein the machine-readable instructions are configured to cause the data processor to generate signals useful in the controlling motion on each of the at least one axis of motion using a plurality of servo applications electronically cammed together on a standardized backplane of coded instructions.

6. An automated device comprising:

a delivery device having a numerically controlled delivery drive for: loading a workpiece at an intake position of the delivery device; separating the workpiece by moving the workpiece from the intake position; accelerating the workpiece; and presenting the workpiece at a predetermined delivery time, delivery position, delivery speed and moving along a delivery trajectory, wherein the workpiece comprises: a platform with mounts supporting a first component in a selected orientation; and a locating surface;

a receiving device having a numerically controlled receiving drive for moving along a receiving trajectory configured to permit transfer of the workpiece at the delivery position from the delivery device to the receiving device;

a processing device having a numerically controlled processing drive for processing the workpiece with a processing tool while the workpiece is on the receiving device;

the numerically controlled receiving device being configured for presenting the workpiece at a predetermined ejection time, ejection position, ejection speed and moving along an ejection trajectory;

a completion device having a numerically controlled completion drive for moving along a completion trajectory configured to transfer the workpiece at the ejection position from the receiving device to the completion device, wherein the delivery device, the receiving device and the completion device include releasable connectors for engaging and disengaging the locating surface of the workpiece, the delivering of the workpiece and the receiving of the workpiece being electronically synchronized by the numerically controlled delivery and receiving drives, the processing of the workpiece being electronically synchronized by the numerically controlled processing drive, and the ejection of the workpiece and the transferring of the workpiece being electronically synchronized by the numerically controlled delivery and receiving drives.

7. The automated device according to claim 6 wherein, the platform has mounts supporting a second component; and the processing tool comprises an assembly tool for assembling the first and second components together with while the workpiece is on the receiving device.

8. The automated device according to claim 6 wherein, the platform and mounts include a fluid port; and the processing tool includes an outlet port for conveying fluid to the fluid port while the workpiece is on the receiving device.

9. The automated device according to claim 6 wherein, the locating surface comprises a pin with a locating groove; and the releasable connectors comprise grip fingers actuated between an open position and a closed position engaging the pin and locating groove.

10. The automated device according to claim 9 wherein the workpiece comprises a base joined to the platform with the pin.

11. The automated device according to claim 6 comprising a rotary engine wherein:

the delivery device comprises a rotary actuated input indexing platform configured to pick the workpiece from an input stream of like workpieces;

the receiving device comprises a rotary tool platform on which the processing tool is mounted; and the completion device comprises a rotary actuated input indexing platform configured to place the workpiece from the receiving device into an output stream of like workpieces.

12. The automated device according to claim 6 comprising a pick and place engine wherein:

the workpiece comprises an individual component;

the delivery device comprises a rotary actuated input indexing platform configured to pick a component from an input stream of like components;

the receiving device comprises a pick and place robot; and the completion device comprises a linear actuated conveyor configured to accept the component from the pick and place robot.

13. The automated device according to claim 12 wherein the processing tool comprises an optical scanner configured to scan the component to identify a surface feature and determine an input orientation based on the surface feature; and the pick and place robot includes a rotary grip in communication with the optical scanner configured to rotate the component from the input orientation to an output orientation.

14. The automated device according to claim 13 wherein the linear actuated conveyor comprises a platform with multiple mounts supporting multiple components in the output orientation as placed by the pick and place robot.

15. The automated device according to claim 6 comprising a multiplex engine wherein the delivery device comprises a rotary actuated input indexing platform;

the receiving device comprises a pick and place robot; and the completion device comprises a linear actuated conveyor configured to present the workpiece to the pick and place robot before processing and to accept the workpiece from the pick and place robot after processing.

16. The automated device according to claim 15 wherein the processing tool is mounted to a stationary base.

\* \* \* \* \*